(12) United States Patent
Psaltis et al.

(10) Patent No.: US 7,136,206 B2
(45) Date of Patent: Nov. 14, 2006

(54) METHOD AND APPARATUS FOR IMPLEMENTING A MULTI-CHANNEL TUNABLE FILTER

(75) Inventors: Demetri Psaltis, Pasadena, CA (US); Christophe Moser, Pasadena, CA (US); Greg Steckman, Pasadena, CA (US); Karsten Buse, Gmhuette (DE); Ingo Nee, Papenburg (DE); Joerg Hukriede, Lengerich (DE)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/004,319

(22) Filed: Dec. 3, 2004

(65) Prior Publication Data

US 2005/0084211 A1    Apr. 21, 2005

(51) Int. Cl.
*G03H 1/02* (2006.01)
(52) U.S. Cl. ............... 359/7; 359/30; 359/3; 359/566; 359/1
(58) Field of Classification Search ............... 359/1, 359/3, 7, 11, 30, 566, 578, 579; 385/37
See application file for complete search history.

(56) References Cited

U.S. PATENT DOCUMENTS

| 5,413,884 | A | * | 5/1995 | Koch et al. ............... 430/5 |
| 5,491,570 | A | * | 2/1996 | Rakuljic et al. ............... 359/7 |
| 6,760,526 | B1 | * | 7/2004 | Ellison et al. ............... 385/123 |
| 2001/0021294 | A1 | * | 9/2001 | Cai et al. ............... 385/37 |
| 2002/0015919 | A1 | * | 2/2002 | Kristensen et al. ............... 430/321 |
| 2003/0077039 | A1 | * | 4/2003 | Kurihara et al. ............... 385/37 |
| 2004/0264858 | A1 | * | 12/2004 | Rothenberg ............... 385/37 |

* cited by examiner

Primary Examiner—Fayez G. Assaf
(74) Attorney, Agent, or Firm—Brown Raysman Millstein Felder & Steiner LLP

(57) ABSTRACT

The present invention provides a multi-channel tunable filter and methods for making such a filter. In one embodiment, the filter comprises a bank of gratings imprinted into a filter material, such as Lithium Niobate. In another embodiment, the filter comprises a bank of gratings imprinted on a thin-film filter. An optical read-head comprising a pair of lenses is configured to pass light from within an optical fiber carrying multiple wavelengths through an appropriate grating to extract or drop a specific wavelength. To ensure continuous data transmission, the filter is tuned to a wavelength by configuring the read-head to move in a hitless manner. In one embodiment, the gratings are recorded by the interference of two beams. A first plane wave reflects off a first mirror stack and a second plane wave reflects off a second mirror stack. In another embodiment, the gratings are recorded by a phase masking method.

5 Claims, 14 Drawing Sheets

Phase mask Top view

Far field recording

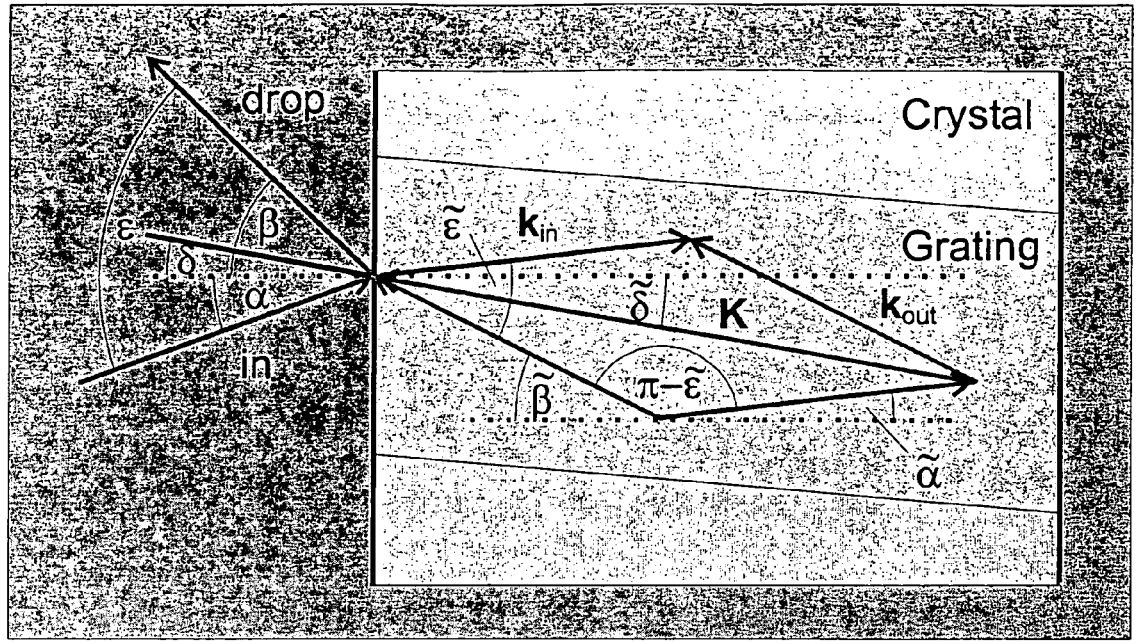

$\tilde{\alpha}$ = input beam in the crystal; $\alpha$ = input beam in air $\tilde{\beta}$ = output beam in the crystal; $\beta$ = output beam in air;

$\tilde{\varepsilon}$ = full angle between the read out beams in the crystal;

$\varepsilon$ = full angle between the read out beams in air;

$\tilde{\delta}$ = slant angle of the grating vector in the crystal at room temperature;

$\tilde{\delta}^H$ = slant angle of the grating vector in the crystal at 180 °C;

$\delta$ = slant angle of the dual fiber collimator;

$\mathbf{K}$ = grating vector; $\mathbf{k}_{in}$ and $\mathbf{k}_{out}$ = wave vectors (in and out);

$\Lambda_G$ = grating period of the refractive index pattern at room temperature;

$\Lambda_G^H$ = grating period of the refractive index pattern at 180 °C;

$\Lambda_P$ = grating period of the phase mask;

$\lambda_R$ = read out wavelength $n_R$ = refractive index for infrared light $a_z = 4.5 \cdot 10^{-6} K^{-1}$; $a_y = 1.5 \cdot 10^{-5} K^{-1}$; thermal expansion koefficients $T_R = 25°C$, read out temperature; $T^H{}_R = 180°C$, recording temperature; $\Delta T = 155K$;

FIGURE 11

METHOD AND APPARATUS FOR IMPLEMENTING A MULTI-CHANNEL TUNABLE FILTER

RELATED APPLICATION

The applicant claims priority to provisional patent application No. 60/251,350 filed Dec. 4, 2000.

BACKGROUND OF THE INVENTION

1. Field of the Invention

The present invention relates to fiber optics, and in particular the invention is directed to a multi-channel tunable filter.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Digital and analog information is often communicated using optical fibers. In some schemes, many signals, each with its own optical wavelength, are communicated on the same optical fiber. At some point, it is necessary to add or to extract a signal (i.e. a particular optical wavelength) from the optical fiber and this is accomplished with an optical add/drop filter. Various type of optical filters have been developed for use in telecommunications. Fixed wavelength optical filters are the most commonly used in today's networks to filter optical channels off a multiplexed stream of wavelengths. A problem with fixed wavelength filters is that they are limited to a single fixed optical wavelength. The increasing rate at which information is transferred makes the network increasingly difficult to manage. Network manageability can be simplified by selectively routing information at the wavelength level. This can be understood by a review of optical signal transmission schemes.

With the rapid emergence of the Internet, there is a great need to increase the volume of data that can be transmitted across a network of computing devices (commonly termed bandwidth). Initially, optical fiber networks carried only a single signal at a single wavelength. The bandwidth of optical fibers was increased by using a scheme known as wavelength division multiplexing (WDM).

The concept of WDM is to launch and retrieve multiple data channels in and out, respectively, of an optical fiber. Prior to the use of WDM, most optical fibers were used to unidirectionally carry only a single data channel at one wavelength. WDM divides a network's bandwidth into channels, with each channel assigned a particular channel wavelength. This allows multiple signals (each at a different wavelength) to be carried on the same transmission medium For example, multiple optical channels can be used with fiber optic cable to transmit multiple signals on the same cable. The gain in the network bandwidth is given by the aggregation of multiple single channel bandwidth.

In most situations, the channels are merged (multiplexed) at a transmitting end and transmitted to a receiving end where they are separated (demultiplexed) into individual signals. In the existing systems, the transmitting and receiving ends must be tuned to the same wavelengths to be able to communicate. That is, the transmitting and receiving ends use a device such as an add/drop multiplexer to transmit/receive a fixed signal channel. In the case of fiber optic cable, an optical add/drop multiplexer can be used at nodes or at the receiving ends to generate a fixed wavelength (e.g., using lasers) and to receive a fixed wavelength. For example consider four channels 1, 2, 3 and 4. If the transmitting end is sending via channel 1, the receiving end must tune into the channel 1 wavelength as well to receive the data signal. When the transmitting end switches to channel 2, the receiving end must follow as well. Existing systems have as many as 2–128 signal channels.

In WDM, add/drop filters are needed to direct traffic in Long-Haul or Metropolitan networks. Current drop filter implementations lack flexibility. Some implementations have fixed wavelength drop filters. In these filters, each add/drop filter is fixed, meaning it is configured to extract and transmit only a specific wavelength within the optical fiber. This limits the flexibility for bandwidth allocation that WDM can provide.

In other filters where switching is allowed, the switching is often done in a non-hitless manner, meaning data is lost or interrupted during switching. Achieving hitless (non-blocking) wavelength switching is a challenge in drop filter design. In many critical applications the loss of data signal or interruption of service during wavelength switching is unacceptable. In these applications, the ability to hitlessly select a new wavelength without interruption of data flow is a requirement. However, many existing implementations of prior art tunable add/drop filters do not have this hitless property.

Typical examples of tunable optical filters include Fabry-Perot based tunable filters ("Fabry-Perot Tunable Filters Improve Optical Channel Analyzer Performance", Calvin Miller, Lawrence Pelz, Micron Optic Corp. and Siemens Corp.), ring resonator tunable filters ("Micro-ring Resonator Channel Dropping Filters", B. E Little, S. T Shu, H. A. Haus, J. Foresi, , J.-P Laine, Journal of Lightwave Technology, vol 15. No 6, 1997), Fiber Bragg grating (FBG) tunable filters ("Bragg grating Fast tunable filter for wavelength division multiplexing", A. Iocco, H. G Limberger, R. P Salathe, L. A. Everall, K. E. Chisholm, J. A. R Williams, I. Bennion), thin film tunable filters (www.santec.com), Acousto-Optic tunable filter ("Ti:LiNbO$_3$ Acousto-optic tunable filter (AOTF)", T. Nakazawa, S. Taniguchi, M. Seino, Fujitsu, Sci. Tech. J, 35, 1, pp 107–112, 1999), Mach-Zehnder interferometers and electro-optic tunable filters. A review of these type of tunable optical filters is presented in "Tunable Optical Filters for Dense WDM Networks", D. Sadot, E. Boimovich, IEEE communication magazine, December 1998, page 50–55.

Fabry-Perot (FP) and ring resonator (RR) filters are based on the same principle: light bounces back and forth between two high reflectivity mirrors or circulate multiple times in the ring. Tunability is achieved by changing the optical path between the mirrors (or in the ring). By tuning from one wavelength to another, all wavelengths in-between are being swept during tuning yielding a blocking tuning. Fiber Bragg gratings use a periodic perturbation of the refractive index of a material to selectively reflect a particular wavelength: tunability is achieved by changing the period of the perturbation by applying mechanical or thermal stress. This tuning mechanism is blocking as well.

Tunable thin film filters are made by deposition of multiple layers of varying thickness and index of refraction. Tunability is achieved by spatially varying the layer thickness. Acousto-optic filters rely on the modulation of the index of refraction by the interaction of a acoustical wave launched in the material with a transducer. Tunability is achieved by varying the frequency of the acoustical wave.

Although such a tuning mechanism is non-blocking (hitless), these filter are relatively broad-band (>1 nm) and difficult to fabricate.

SUMMARY OF THE INVENTION

The present invention provides a multi-channel tunable filter and methods for making (or recording) such a filter. In one embodiment, the tunable filter comprises a bank of gratings imprinted into a holographic substrate material, such as Lithium Niobate. Each grating reflects light at a specific wavelength, allowing light waves of all wavelengths except one to pass. In another embodiment, the tunable filter comprises a bank of thin film filters. For thin films, each grating reflects all wavelengths except a specific one. This allows light wave of only one wavelength to pass. An optical read-head comprising a pair of lenses (e.g. one dual fiber collimator and a single fiber collimator or two dual fiber collimators or two single lens collimators on each side) is configured to collimate the light which is then sent through an appropriate grating. The light reflected (a single wavelength for the holographic gratings and all wavelengths minus one for the thin film) is captured by the collimator positioned appropriately on the same side as the input collimator, the remainder of the channels (all minutes one for the holographic gratings and a single wavelength for the thin film) are captured by a collimator positioned on the opposite side of the filter. The collimator receiving the filtered wavelength is called the drop collimator. Conversely, the drop collimator can also configured to add a wavelength instead of dropping a wavelength. Thus the tunable filter of the invention can add or drop one of the wavelengths from an optical fiber carrying multiple wavelengths.

In one embodiment of the present invention, the optical head is configured to move in a manner that avoids passing light waves through other gratings when a new grating is selected. This enables the tunable filter to achieve non-blocking (or hitless) architecture. If a different wavelength is desired to be added or extracted from the same fiber, the optical head moves to the appropriate grating in this hitless manner. In an alternate embodiment, the tunable add/drop filter of the present invention can be implemented in a blocking implementation.

In one embodiment, the gratings are made (or recorded) by the interference of two light beams. We call this method holographic. The angle between both beams and other parameters determine the period of the grating and hence the wavelength that has to be selected. Since the filter contains several gratings with different periods, the holographic material has to be illuminated by multiple pairs of beams at different positions over the material.

To record the gratings simultaneously two different recording techniques can be used:
1) A first plane wave reflects off a first mirror stack and a second plane wave reflects off a second mirror stack. The mirror stack is made of individual mirrors that are piled together with the required angle difference. The relative angle between each successive mirror is determined by the required channel spacing.
2) In another embodiment, the gratings are recorded by a phase masking method.

BRIEF DESCRIPTION OF THE DRAWINGS

These and other features, aspects and advantages of the present invention will become better understood with regard to the following description, appended claims and accompanying drawings where:

FIG. 11 shows the relationship between the angle measurements in grating recording according to an embodiment of the present invention.

DETAILED DESCRIPTION OF THE INVENTION

The invention is a multi-channel tunable filter and methods of producing such a filter. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Multi-Channel Tunable Filter

The present invention provides a multi-channel tunable filter. In one embodiment, the tunable filter comprises a bank of gratings imprinted into a holographic material such as Lithium Niobate. In another embodiment, the tunable filter comprises a bank of thin film filters. The two embodiments achieve opposite effects. In the embodiment with holographic material, only the matched wavelength is reflected off the gratings (i.e. the matched wavelength is dropped). In the thin-film filter embodiment every wavelength except the matched wavelength is reflected (i.e. the matched wavelength is extracted). Each grating reflects light at a required wavelength. In one embodiment, the separation of the channels can be set between 25 GHz and 200 GHz, which is the current standard in WDM channel spacing.

Figure 1:
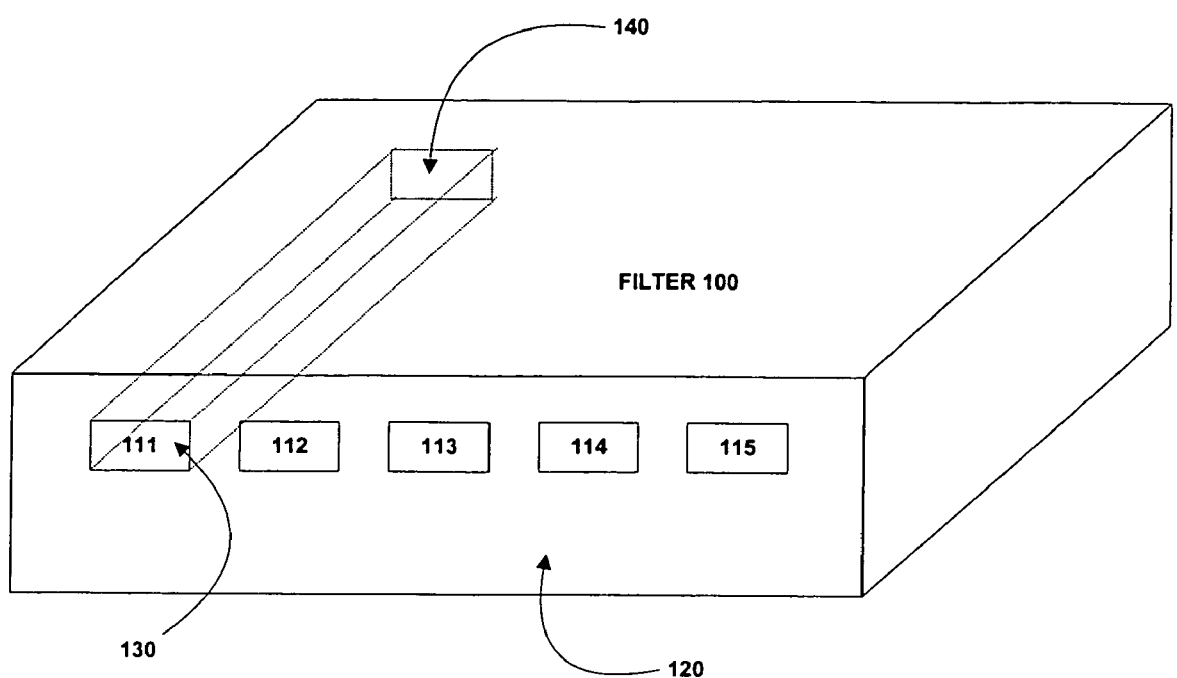
FIG. 1 is a diagram of a multi-channel tunable filter according to one embodiment of the present invention.

FIG. 1 shows an example of a multi-channel tunable filter according to one embodiment of the present invention. Filter 100 is a three dimensional filter having multiple gratings 111–115. Each grating occupies only a portion of a vertical area 120 of the filter 100. A lightwave carried by a fiber optic cable is collimated by standard optics (not shown). The parallel beam of light eventually reaches one of the gratings at a first side 130 of the grating. Then it propagates through the inside of the grating, exiting at a second side 140 of the grating.

Figure 2:
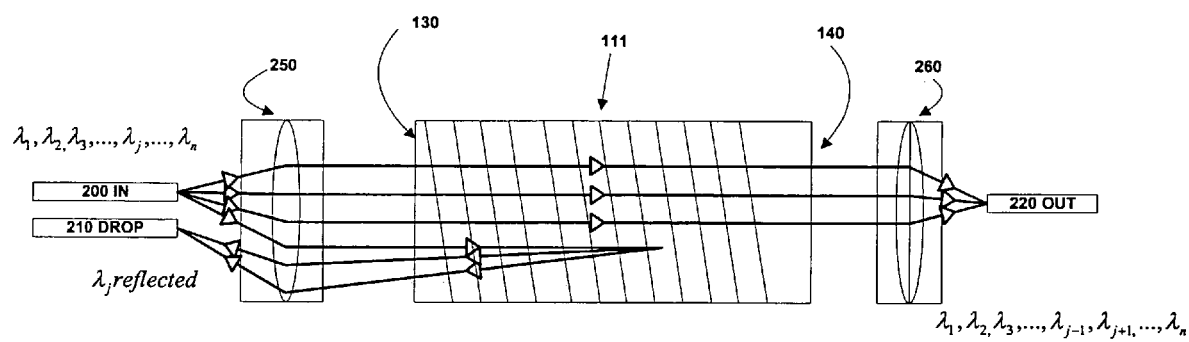
FIG. 2 is a cross-section diagram of a single grating.

FIG. 2 depicts cross section of grating 111. A light wave carrying wavelengths $\lambda_1, \lambda_2, \lambda_3, \ldots, \lambda_j, \ldots, \lambda_n$ enters in side 130 and exits from side 140. The lightwave from fiber optic "IN" line 200 passes through collimator 250, which through standard optics realigns the lightwave into parallel rays. The parallel beam of light then enters into grating 111 at a first side 130. The grating is a periodic modulation of the medium's index of refraction. Its grating vector determines the orientation and the period length of the grating. For light beams with certain wave vectors the light wave fulfills the so-called Bragg condition and is diffracted in this case by the grating. That means that for a certain input angle of the light beam the light wave can only be diffracted for a certain wavelength. This effect is described in detail by Kogelnik's formula ("Coupled Wave Theory for Thick Hologram Gratings", H. Kogelnik, Bell Syst.Tech. J., 48, 2909 (1969)).

The effect of the periodic index modulation is similar to a series of partially reflecting mirrors. In one embodiment, there are around sixty-thousand partial mirrors in each grating. (The present invention is not limited to a specific number of partially reflecting mirrors, this figure is given by way of example only). In the figure, the partially reflecting mirrors are represented by the slanted lines in grating 111. In one embodiment, the partial mirrors are optically engraved in the material. By spacing the partial mirrors correctly (the period of the grating), an optical condition is created wherein only one wavelength is totally reflected off the grating. In grating 111, $\lambda_j$ is reflected off the grating while all other wavelengths are allowed to pass through and exit through side 140. Collimator 260 then directs the passthrough wavelengths to the "OUT" line 220. The reflected $\lambda_j$ is directed to a "DROP" line 210.

Each grating has a different optical condition caused by a different spacing of the partial mirrors. Hence each grating reflects a different wavelength. Referring back to filter 100 of FIG. 1, the desired wavelengths can be reflected (i.e. dropped) by directing the light through the appropriate grating.

Alternatively the system can be used to add a wavelength as well. Instead of the drop line 210 being a receiving node, it can be a sending node. Its output is provided to the filter block where it is reflected back to combine with wavelengths travelling through the filter in the opposite direction. In such a system the 220 out fiber would be an input fiber and the 200 in fiber would be an out fiber, carrying the original wavelengths and the added wavelength.

In another embodiment of the present invention, grating 111 (and all other gratings in the filter) is configured to only allow $\lambda_j$ to pass through the filter. This embodiment operates in the opposite manner as depicted in FIG. 2. $\lambda_j$ in this embodiment passes through and exits on side 140 to collimator 260. All other wavelengths coming through collimator 250 are reflected. Thus each grating can extract a specific wavelength.

In another embodiment of the present invention, instead of filtering out only one wavelength, multiple wavelengths can be filtered at the same location. To accomplish this, multiple gratings are superimposed in the same volume. When light passes through the grating, multiple wavelengths are filtered at the same time.

Optical Read-Head

Figure 3:
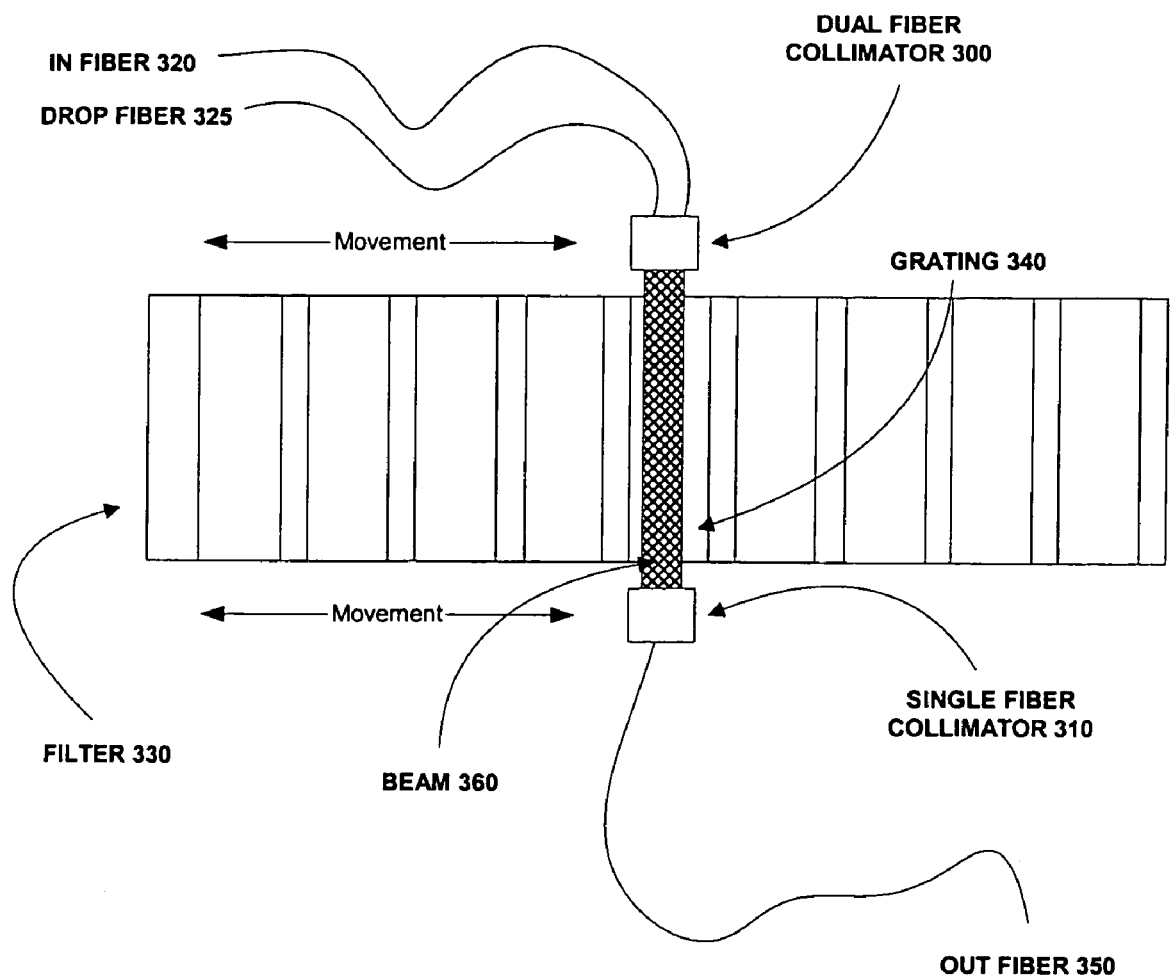
FIG. 3 is a diagram of an optical read-head according to one embodiment of the present invention.

In one embodiment, an optical read-head comprising a dual fiber collimator and a single fiber collimator is configured to extract or drop one of the wavelengths from an optical fiber carrying multiple wavelengths bypassing light through an appropriate grating. FIG. 3 shows an optical read-head according to one embodiment of the present invention. The read-head comprises a dual fiber collimator 300 and a single fiber collimator 310 (The dual fiber collimator is presented as an example embodiment, the invention can also be practiced, for example, with two single fiber collimators side by side). The collimators comprise fibers, with the tip of the fibers placed in front of a lens at its focal plane. The light that exits the fiber is spherical. When it reaches the lens, it is collimated at the lens and exits the lens as a parallel beam of light.

The collimated light beam 360 from collimator 300 carries multiple wavelength channels. A specific desired wavelength channel is reflected from the specific grating 340 (gratings denoted by parallel lines) and directed into either the input "IN" fiber 320 or in the "DROP" fiber 325 of the dual fiber collimator 300 (Use of the dual fiber collimator avoids having the dropped wavelength going back into the same fiber. This configuration avoids the need to use a circulator to extract the light beams travelling in opposite directions. This is a disadvantage of prior art Fiber Bragg grating, which requires the circulator, because a circulator is an expensive component. Directing the light into another fiber is accomplished in the present invention by slanting the grating slightly, as shown in the equations and drawings, in order to avoid the Fresnel reflection from the entrance face of the material). All remaining channels minus the reflected wavelength channel are received and coupled to output "OUT" fiber 350 by the single fiber collimator. The beam size is smaller than the grating width to read out only one grating at a time, respectively. In one embodiment, each grating in the filter 330 is 0.9 millimeters wide and the beam size is 0.5 millimeters. Note, that the size of each grating as well as the beam size can vary to pack more or less gratings. (Note also that multiple overlapping gratings can be placed at the same location and slanted differently so that multiple reflected wavelengths can be captured by multiple collimators.)

In other embodiments, the spacing of the gratings can vary continuously across the filter. In this arrangement, the spacing between the gratings can increase or decrease across the filter in a continuous way, such as described in U.S. Pat. No. 5,189,532. The read-head moves horizontally across the filter to select the appropriate grating to drop a desired wavelength channel. In another embodiment of the present invention, the optical read-head is comprised of two dual fiber collimators (such as where, for example, one is for drop and one is for add).

Hitless Architecture

The filter of one embodiment of the invention is three dimensional and is divided into an upper and a lower region. The upper region contains the different gratings used to select a certain wavelength. The lower region does not contain any gratings. Hence the optical read head can move in the lower region horizontally in a hitless manner without interrupting light beams. To tune the system to a different channel the optical head is configured to first move in a vertical direction from the upper region to the lower region. Then it moves horizontally in the lower region of the filter to the position above which the material contains the desired grating. Afterwards the optical read head is moved in a vertical direction from the lower to the upper region again into the grating region.

Figure 4:
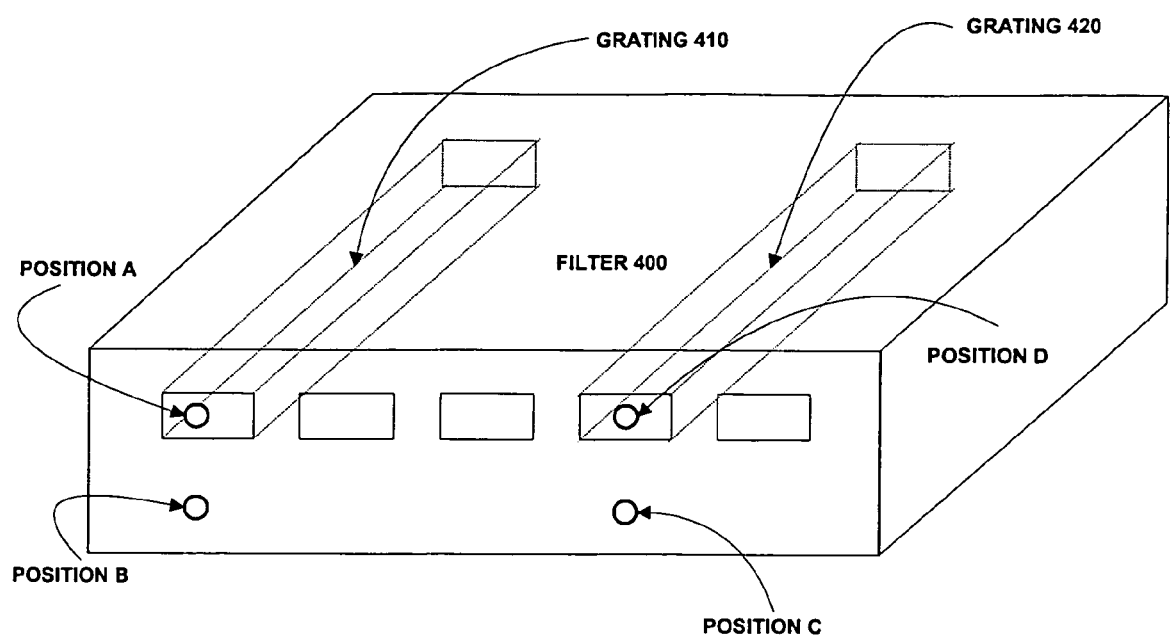
FIG. 4 shows a multi-channel tunable filter configured to operate in a hitless manner according to one embodiment of the present invention.

The tuning of the filter usually is accomplished within hundreds of milliseconds and no data traffic is lost or interrupted as a result of the move. FIG. 4 provides an example of this embodiment of the present invention. Consider an example where an optical read-head (not shown) is currently in position A on filter 400. At this position, a wavelength that grating 410 is configured to reflect for adding or dropping from a fiber. If at some point another wavelength is desired to be added or dropped, the optical read-head moves as follows. First, the optical read-head moves vertically with respect to filter 400 to position B in the lower region of the filter. At position B, no grating exists, so no wavelength channels are reflected. Next, the head moves horizontally in the lower region with respect to filter 400 to position C Then, the read-head moves vertically again to position D in the upper region, positioned at a grating that reflects a different wavelength. At this position, a different wavelength is added or dropped from the fiber, wherein the reflected wavelength is one for which grating 420 has been configured. At the time that the read-head moves horizontally, no light is passed through any grating, which makes the architecture hitless. To achieve such functionality, all gratings are located close to the surface of the filter. (It should be noted that the invention can provide a tunable, but blocking, filter by not providing or using the lower region. In the blocking implementation, moving the filter over one or more gratings on the way to a desired grating results in temporary affect on the wavelengths reflected by the intermediate filters.)

In one embodiment, the filter itself is a holographic material, and may be comprised, for instance, of Lithium Niobate. In another embodiment, the filter is a thin-film filter and behaves as a band pass filter, allowing only the desired wavelength to pass through and reflecting all other wavelengths. In one embodiment of the present invention, the optical read-head is fixed and the filter moves to accomplish the same hitless effect.

Figure 5:
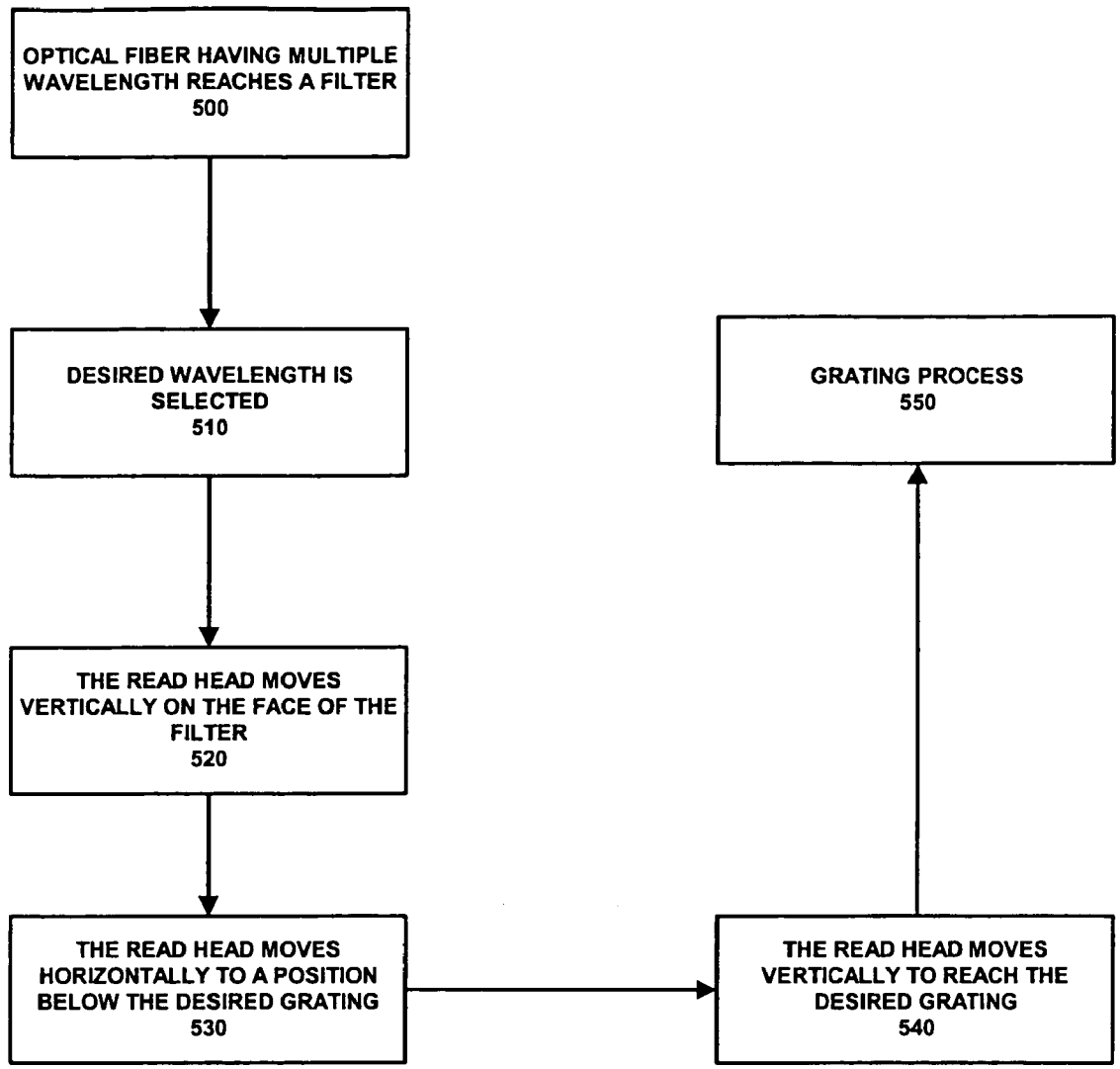
FIG. 5 is a flowchart showing the operation of a multi-channel tunable filter configured to operate in a hitless manner according to one embodiment of the present invention.

FIG. 5 is a flowchart showing the operation of a tunable filter according to one embodiment of the present invention. At block 500, an optical fiber having multiple wavelengths of light reaches a filter. At block 510, a desired wavelength is selected. At block 520, the read-head moves vertically on the face of the filter until the grating. Next, it moves horizontally to a position below the desired grating at block 530. Then, it moves vertically again to reach the grating at block 540. At block 550 the light wave is passed through the grating.

Grating Recorder

In one embodiment, the gratings are made (or recorded) by the interference of two beams. A first plane wave reflects off a first mirror stack and a second plane wave reflects off a second mirror stack. The mirror stack is made of individual mirrors that are piled together with a given angle difference. The relative angle between each successive mirror is determined by the required channel spacing.

Figure 6:
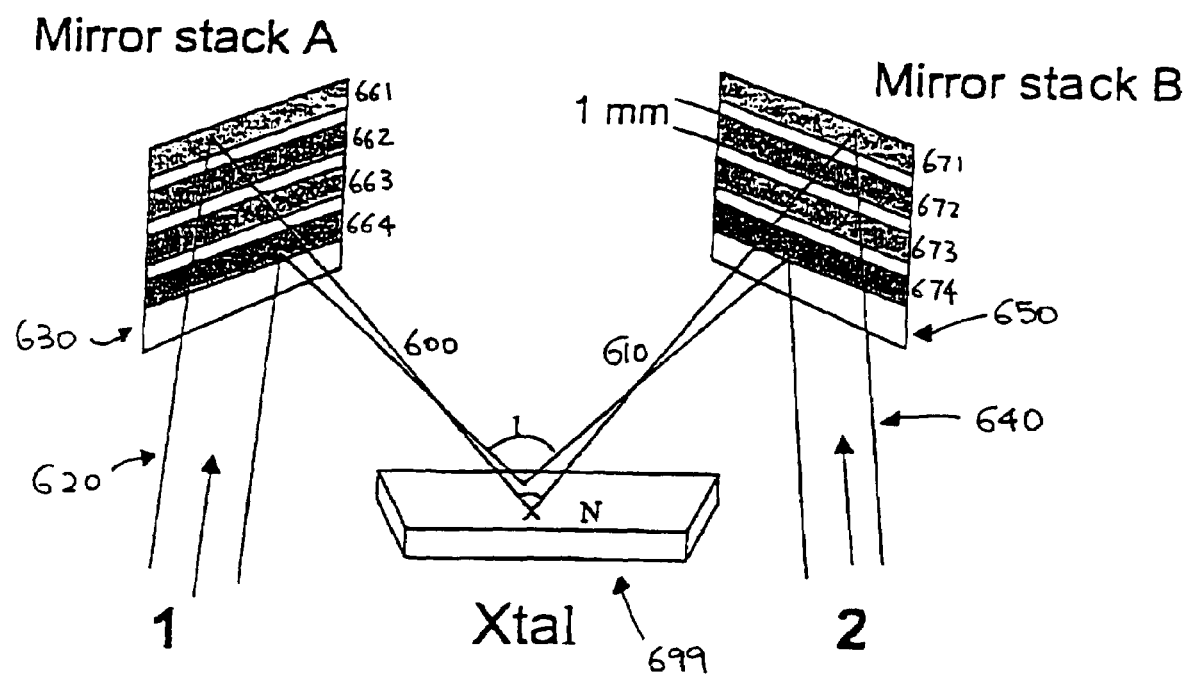
FIG. 6 shows a configuration for recording gratings according to one embodiment of the present invention.

FIG. 6 shows a configuration for recording gratings according to one embodiment of the present invention. The gratings are recorded in transmission geometry by the interference of two beams 600 and 610. The (wavelength of the) beams, in one embodiment, are 514 nm or 532 nm (The above are given byway of example only, the present invention can be implemented with different holographic materials working with different illumination wavelengths. Even, for example, Lithium Niobate light wavelength from the visible wavelength region (maximum at 477 mn) may be used to record the gratings. This depends on the sensitive wavelength region of the material that can be used for recording.)

A first plane wave 620 reflects off a first mirror stack 630 onto recording material 699. Recording material 699 is comprised of a holographic material. A second plane wave 640 reflects off a second identical mirror stack 650 onto recording material 699. In one embodiment, each mirror stack 630 and 650 is comprised of individual mirrors 661–664 and 671–674 that are piled together at a given angle difference. The relative angle between each of the successive mirrors is determined by the required filter channel spacing (e.g. 25, 50, 200 GHz). In another embodiment (not shown) the stack is made by diamond turning a block of metal.

Figure 7:
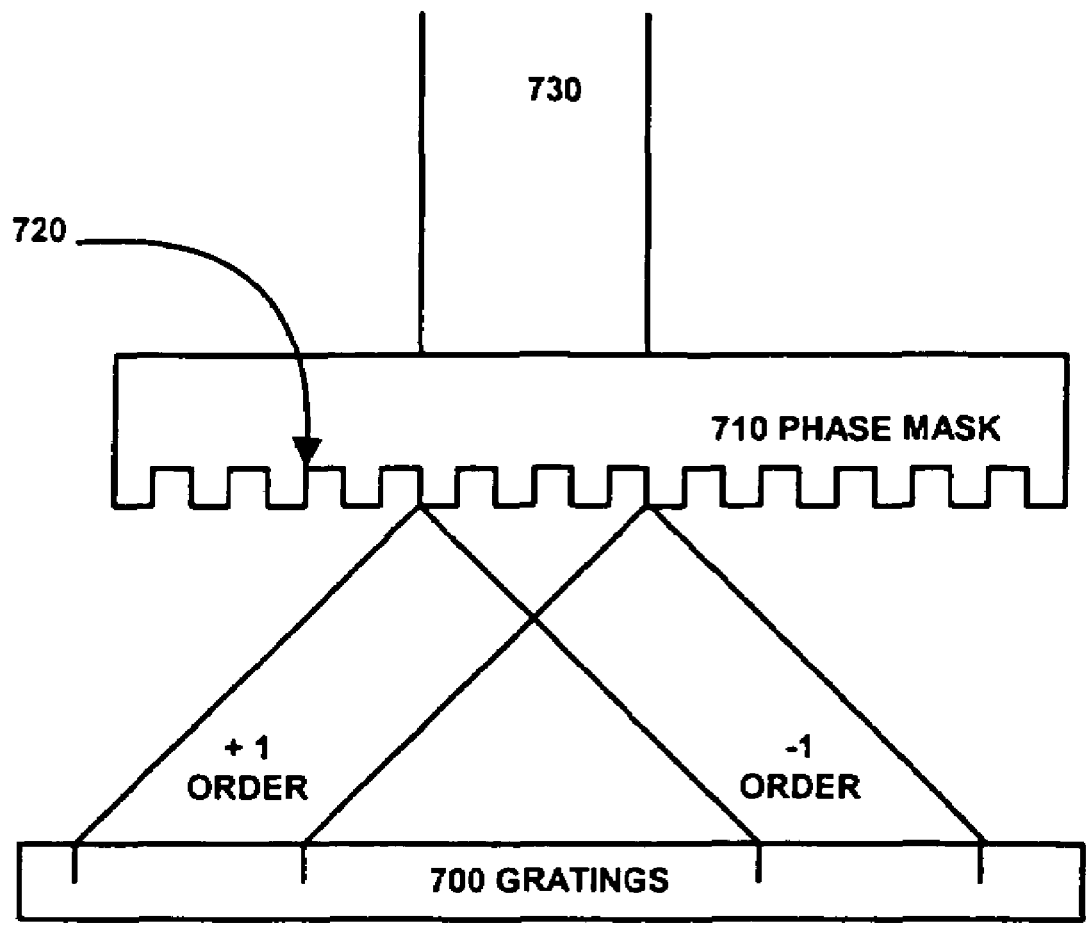
FIG. 7 shows a configuration for recording gratings according to another embodiment of the present invention.
Figure 8:
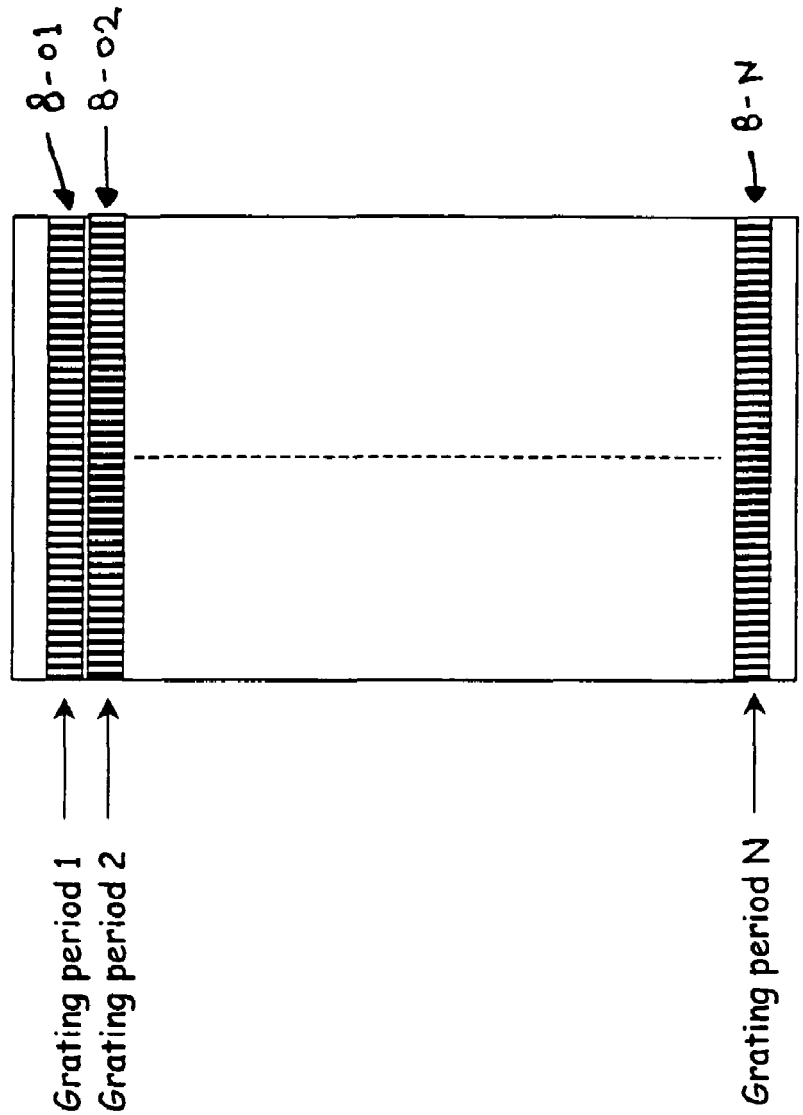
FIG. 8 illustrates the phase mask design of one embodiment of the present invention.

FIG. 7 depicts the recording process according to another embodiment of the present invention. Grating 700 is etched by electron beam or by holographic technique. The phase mask design is shown in FIG. 8. It consists of multiple binary relief gratings 8-01, 8-02, up to 8-N, each with a different period positioned side by side on a single substrate. Dimensions of each grating can be for example 50 mm long by 1 mm wide. The relief grating can be made by e-beam lithography or by holographic techniques. Depending on the wavelength of illumination and the period of the relief grating, the zero order (part of the incident light not diffracted by the grating) can be significant and will reduce the modulation depth of the resulting recorded holographic grating, thus reducing the maximum achievable index variation.

Figure 9:
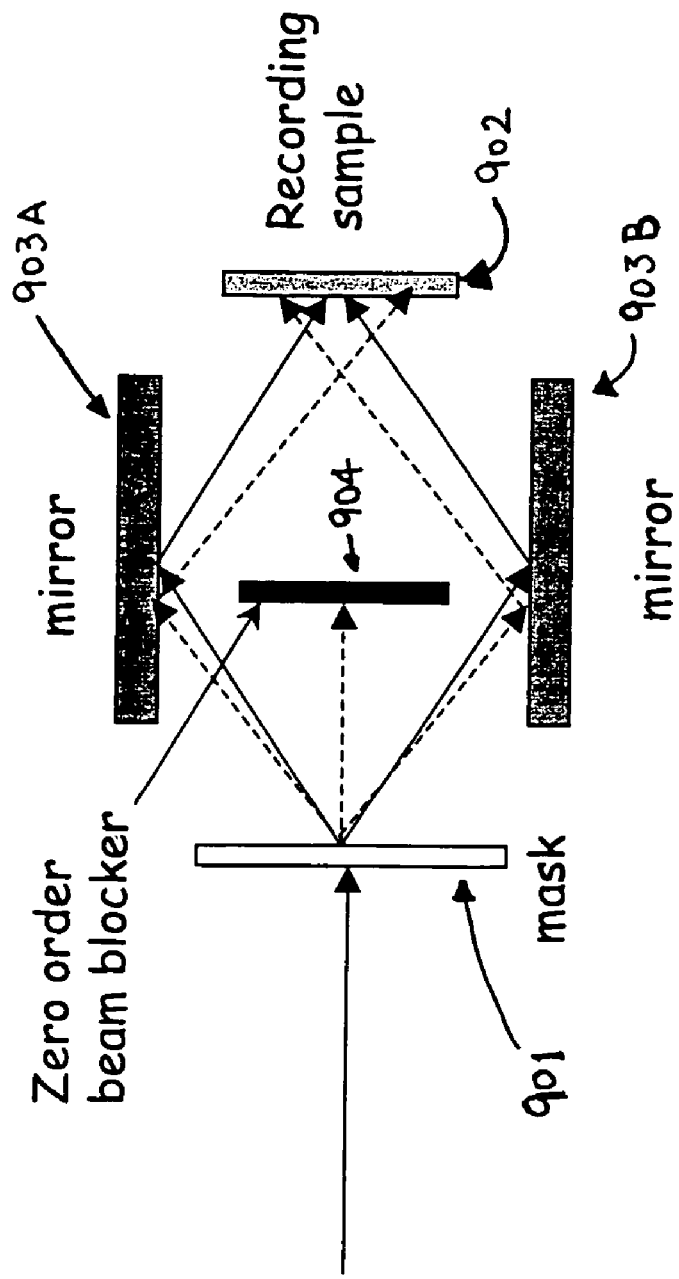
FIG. 9 illustrates a far field recording scheme.

Two recording schemes that can alleviate this problem are presented. In FIG. 9, a far field approach is used. The holographic medium 902 is placed "far" from the phase mask 901. The +1 and −1 diffracted orders are reflected by a pair of mirrors 903A and 903B that recombine the beams at the recording medium. A beam blocker 904 is positioned between the phase mask 901 and recording medium 902 to block the zero order and pass the +1 and −1 diffracted orders.

Figure 10:
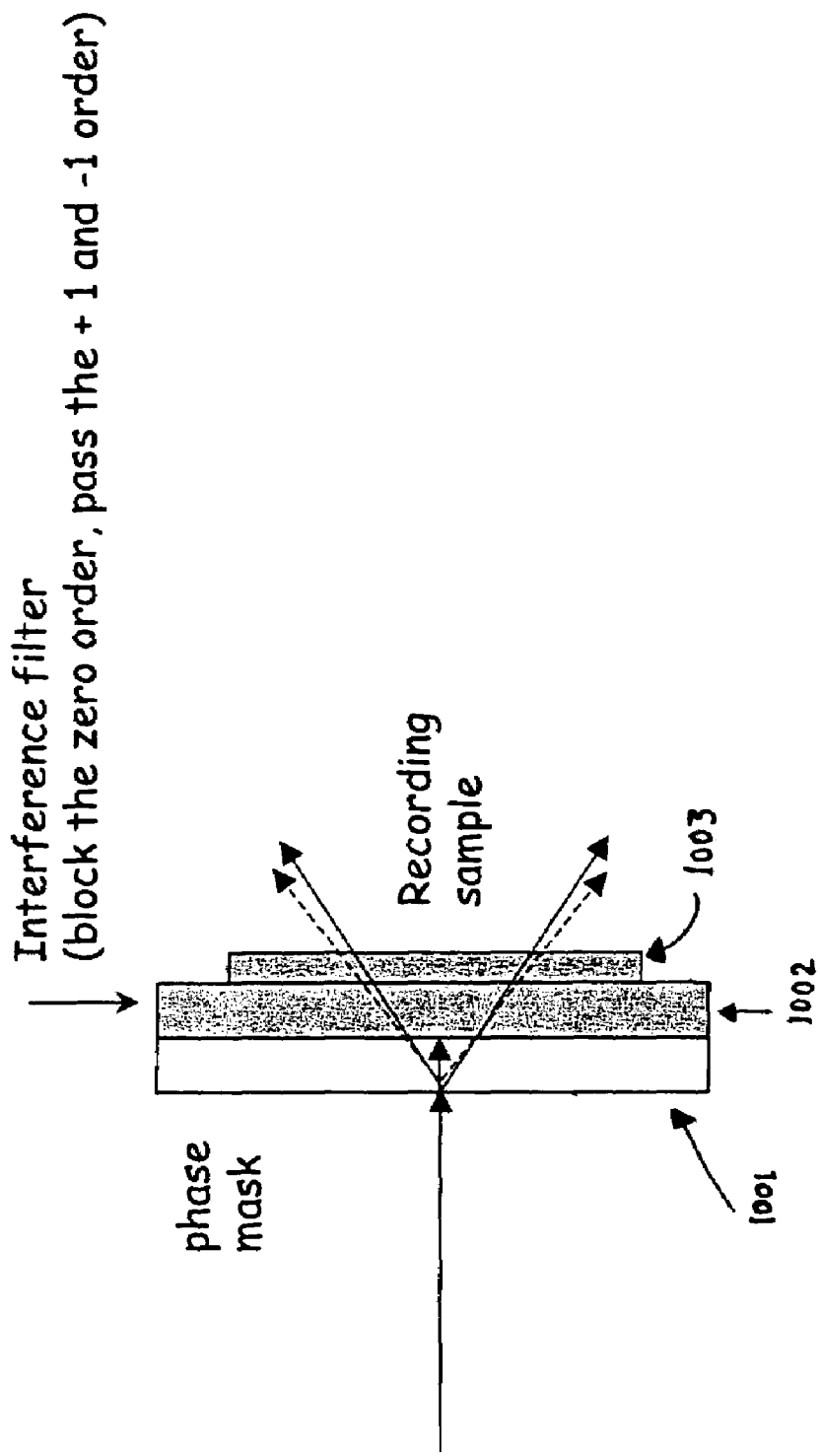
FIG. 10 illustrates a near field recording scheme.

A near field approach is shown in FIG. 10. In this implementation, an interference filter 1002 is sandwiched between the phase mask 1001 and the recording medium 1003. The interference filter is a standard thin film coating. It is designed to reflect the zero order beam and to pass the +1 and −1 order beam. The thickness of the interference filter 1002 is in the order of 2 mm.

It may happen that part of the light that is reflected by the interference filter enters the phase mask again and is diffracted in such a way that additional beams arise that propagate almost parallel to the +1 and −1 order recording beams. To avoid this undesired effect in one embodiment an optical diode comprising of, e.g., an element that rotates the light polarization and a polarizer, is placed between the phase mask 1001 and the interference filter 1002.

Equations and Angle Values

The equations refer to the holographic gratings. FIG. 11 shows the labeling of specific angles and measurement within an embodiment of grating recording. The following equations are based on the labeling and definition given by FIG. 11.

$$\epsilon = \alpha + \beta \quad (1)$$

$$\sin(\alpha) = n_R \sin(\tilde{\alpha}) = n_R \sin(\tilde{\epsilon}/2 - \delta) \quad (2)$$

$$\sin(\beta) = n_R \sin(\tilde{\beta}) = n_R \sin(\tilde{\epsilon}/2 + \delta) \quad (3)$$

Equation (1), (2) and (3) describe the relationship between angles. Based on these three equations, we derive equation (4), which describes how to obtain the value of the full angle between the input collimated beam and the diffracted beam in air:

$$\epsilon = \arcsin[n_R \sin(\tilde{\epsilon}/2-\tilde{\delta})] + \arcsin[n_R \sin(\tilde{\epsilon}/2+\tilde{\delta})] \quad (4)$$

In one embodiment (using this angle, but other angles may be used as well) using equation (4) and knowing
    $\delta = 0.2°$, where $n_R = 2.211 \pm 0.001$ (for dispersion consideration)

the angle is given by $$\epsilon = (2.97 \pm 0.05)°.$$

Equations (5) to (7) are related to the grating period:

$$K^2 = k_{in}^2 + k_{out}^2 - 2k_{in}^2 k_{out}^2 \cos(\pi - \tilde{\alpha} - \tilde{\beta}) \quad (5)$$

$$K^2 = k_{in}^2 + k_{out}^2 + 2k_{in}^2 k_{out}^2 \cos(\tilde{\epsilon}) \quad (6)$$

$$\left(\frac{2\pi}{\Lambda_G}\right)^2 = 2\left(\frac{2\pi n_R}{\lambda_R}\right)^2 [1 + \cos(\tilde{\epsilon})] \quad (7)$$

These three equations yield equation (8), which describes how to obtain the value of the grating period of the refractive index pattern at room temperature.

$$\Lambda_G = \frac{\lambda_R}{n_R \sqrt{2[1+\cos(\tilde{\epsilon})]}} \quad (8)$$

One embodiment of the present invention also takes into consideration of the impact of thermal expansion on the grating period of the refractive index pattern. At 180° C., we have:

$$\Lambda_G^H = \Lambda_G \sqrt{(1+a_z\Delta T)^2 \cos^2(\tilde{\delta}) + (1+a_y\Delta T)^2 \sin^2(\tilde{\delta})} \quad (9)$$

where $$a_z = 4.5 \cdot 10^{-6} K^{-1}; \, a_y = 1.5 \cdot 10^{-5} K^{-1}; \, \Delta T = 155 K.$$

(Note that these specific values are that of LiNbO$_3$ only, other material have different values)

This gives a method of finding the value of the grating period of the refractive index pattern at the recording temperature of 180° C. Using the same constants, equation (10) gives the slant angle of the grating vector in the crystal at 180° C.:

$$\tilde{\delta}_H = \arcsin\left[\frac{\Lambda_G(1+a_y\Delta T)\sin(\tilde{\delta})}{{}^H\Lambda_G}\right] \quad (10)$$

which yields the result of $$\tilde{\delta}_H = 0.2002° \approx \tilde{\delta}.$$

The slant angle at 180° C. is similar to that at room temperature.

Figure 12:
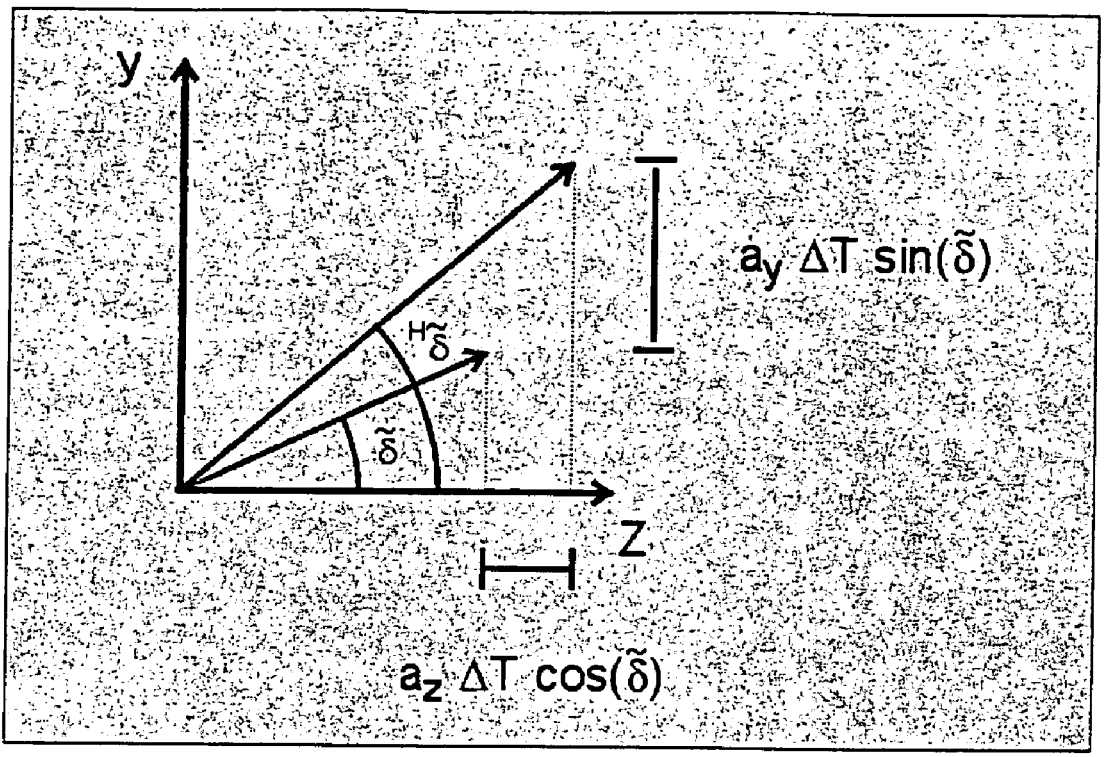
FIG. 12 shows the relationship between the direction of the input collimated beam and the grating vector inside the bulk material according to an embodiment of the present invention.

Finally, FIG. 12 depicts additional variables to show the relationship among the angles depicted in FIG. 11. Knowing the relationship allows us to solve for all angle values, which are:

$$\epsilon = (2.97 \pm 0.05)°; \tilde{\delta} = 0.2°;$$

$$\tilde{\epsilon} = (1.343 \pm 0.023)°;$$

$$\tilde{\alpha} = \tilde{\epsilon}/2 - \tilde{\delta} \approx 0.4715°; \tilde{\beta} = \tilde{\epsilon}/2 + \tilde{\delta} \approx 0.8725°;$$

$$\alpha = \arcsin(n_R \sin(\tilde{\epsilon}/2-\tilde{\delta})) \approx 1.0425°;$$

$$\beta = \arcsin(n_R \sin(\tilde{\epsilon}/2+\tilde{\delta})) \approx 1.9272°;$$

$$\delta = (\beta - \alpha)/2 \approx 0.4424°;$$

Experimental Results

Figure 13:
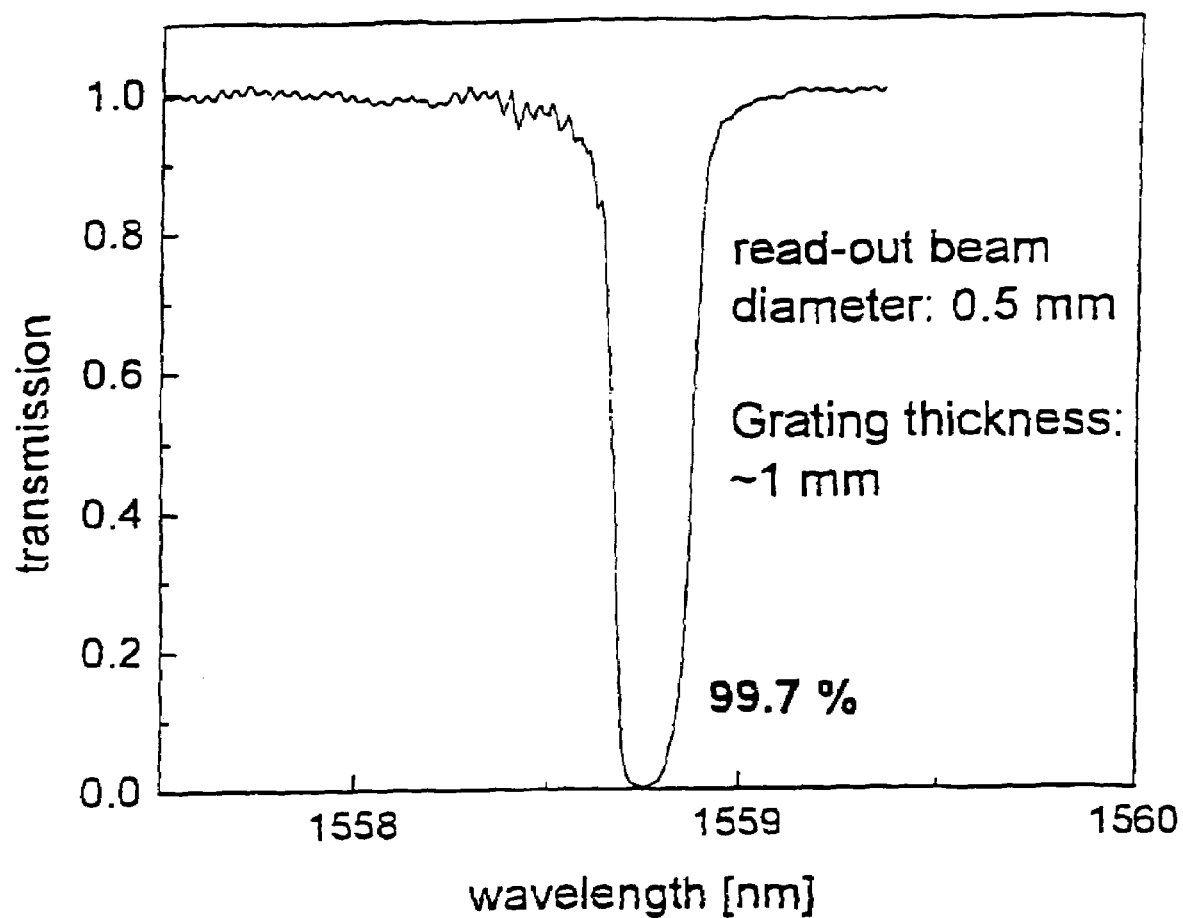
FIG. 13 shows experimental results and illustrates the filter shape and achieved reflected efficiency when an embodiment of the present invention is used.
Figure 14:
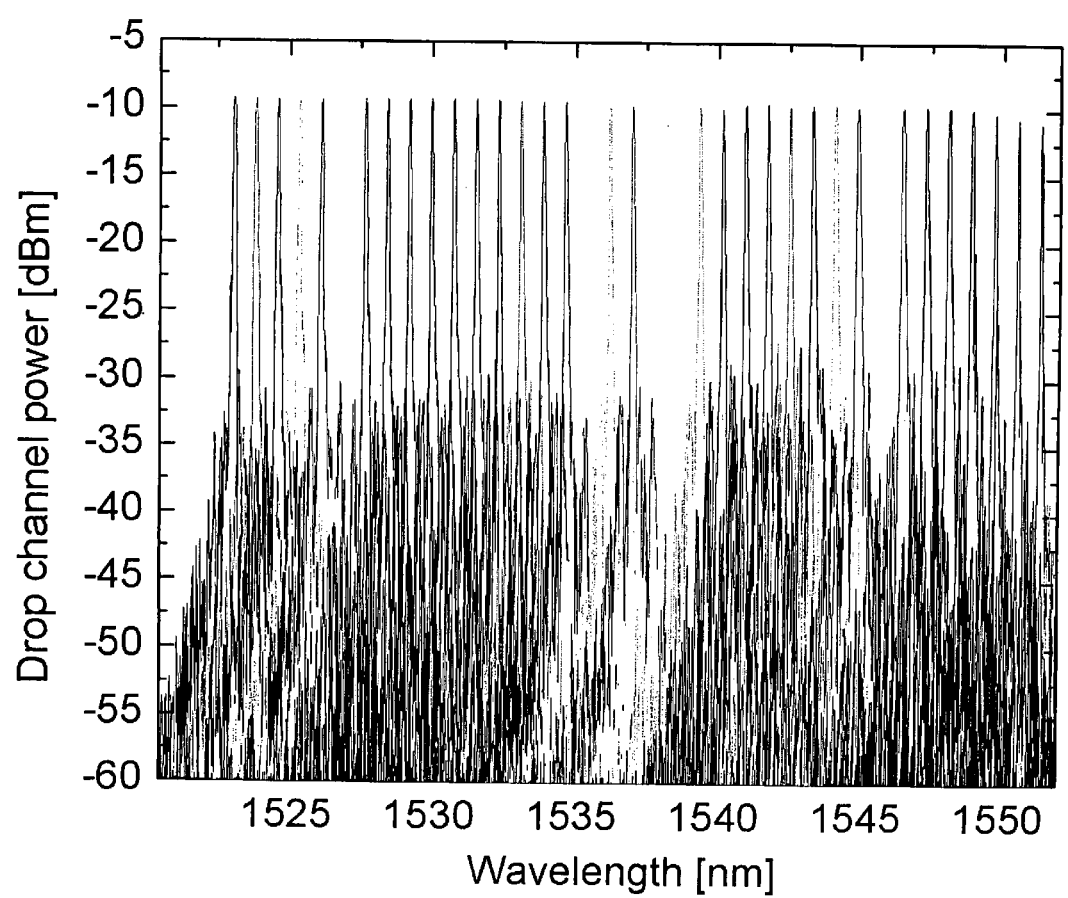
FIG. 14 illustrates experimental results of an embodiment of the invention.

This method records all of the gratings simultaneously on the substrate, which may be comprised of any suitable holographic material such as Lithium Niobate. The results shown in FIG. 13 are accomplished with gratings with a width of about 1 millimeter and a read out beam with a beam diameter of 0.5 millimeters. The graph results illustrate the filter shape and achieved reflected efficiency. In all wavelengths except the reflected wavelength, the transmission is at approximately 1. When the desired wavelength range is reached (in this example between 1558 and 1559 nanometers), the light transmission drops by approximately 99.7% (when a read-out beam of 0.5 millimeters is used with a grating thickness of approximately 1 millimeter). FIG. 14 illustrates drop channel power versus wavelength for a plurality of wavelengths using an embodiment of the invention.

Thus, a multi-channel tunable filter is described in conjunction with one or more specific embodiments. The invention is defined by the claims and their full scope of equivalents.

The invention claimed is:

1. A method for recording gratings comprising:
    reflecting a first beam off a mirror stack, said first mirror stack comprising a plurality of mirrors having a desired angle between successive mirrors;
    reflecting a second beam off a second mirror stack disposed relative to each other such that an interference is produced between reflection of said first beam and reflection of said second beam wherein said interference optically induces a perturbation of the index of refraction in a volume holographic recording material disposed in the path of the reflected beams to form said gratings.

2. The method of claim 1 wherein said recording material is a volume holographic material.

3. A method for recording gratings comprising:
    using a multiple channel phase mask having a plurality of gratings each having a different period to direct a first order beam of said phase mask at a volume holographic recording material; and producing an interference pattern between said first beam and said second beam wherein said phase mask optically induces a perturbation of the index of refraction in a volume holographic recording material to form said gratings.

4. The method of claim 3 wherein said phase mask is used in a far field approach comprising:
    A first mirror reflecting said first order beam and a second mirror reflecting said second order beam, wherein said mirrors can be adjusted angularly to form said gratings in said volume holographic recording material.

5. The method of claim 3 wherein said phase mask is used in a near field approach to form said gratings in said volume holographic recording material.

* * * * *